(12) United States Patent
Sengupta et al.

(10) Patent No.: US 7,818,623 B2
(45) Date of Patent: Oct. 19, 2010

(54) KERNEL DEBUGGING IN A CLUSTER COMPUTING SYSTEM

(75) Inventors: Sabyasachi Sengupta, Bangalore Karnataka (IN); Pramod Sathyanarayana Rao, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 500 days.

(21) Appl. No.: 11/550,538

(22) Filed: Oct. 18, 2006

(65) Prior Publication Data

US 2007/0094532 A1    Apr. 26, 2007

(30) Foreign Application Priority Data

Oct. 26, 2005    (IN)    .................. 2864/DEL/2005

(51) Int. Cl.
*G06F 11/00*    (2006.01)

(52) U.S. Cl. ............................ 714/38; 714/35; 717/129
(58) Field of Classification Search ................... 714/38, 714/35; 717/129
See application file for complete search history.

(56) References Cited

U.S. PATENT DOCUMENTS

| 6,804,813 | B1 * | 10/2004 | Willems et al. | ............. | 717/125 |
| 6,983,452 | B1 * | 1/2006 | Willems | ..................... | 717/128 |
| 2004/0111707 | A1 * | 6/2004 | Bliss et al. | .................. | 717/129 |
| 2005/0034024 | A1 * | 2/2005 | Alverson et al. | ............... | 714/38 |
| 2006/0294592 | A1 * | 12/2006 | Polyakov et al. | ............... | 726/24 |

* cited by examiner

*Primary Examiner*—Yolanda L Wilson

(57) ABSTRACT

An embodiment of a method of maintaining operation of a cluster of computing devices includes an initial step of detecting a suspended kernel process on a first of the computing devices. In addition to the step of detecting the suspended kernel process the method includes the step of issuing a first signal that causes a cluster management process to disregard the first of the computing devices when determining if there exists a quorum of the computing devices.

20 Claims, 6 Drawing Sheets

KERNEL DEBUGGING IN A CLUSTER COMPUTING SYSTEM

BACKGROUND OF THE INVENTION

Just as an application debugger is essential to the development, maintenance and support of application software, a kernel debugger is an essential tool for developing, maintaining, and supporting an operating system kernel. Numerous debugging tools for debugging an operating system kernel have been developed, such as Kernel WildeBeest Debugger (KWDB) from Hewlett Packard. Existing kernel debugging tools are well suited to debugging a single standalone operating system. Unfortunately, existing kernel debugging tools are not well suited to providing kernel debugging in a cluster computing system; that is, two or more independent computers interconnected through a specialized communication interface to achieve increased high availability of services and increased scalability. An example of an undesirable side-effect of using an existing kernel debugger to carry out kernel debugging in a cluster computing system is that the cluster computer system may loose quorum when an operating system is suspended as a result of encountering a halt due to a debugger event, which is due to an operating system (kernel) encountering a breakpoint, watchpoint or catchpoint during execution of the operating system.

BRIEF DESCRIPTION OF THE DRAWING

The invention will now be described by way of example only with reference to the drawings in which.

DETAILED DESCRIPTION OF EMBODIMENTS OF THE INVENTION

Figure 1A:
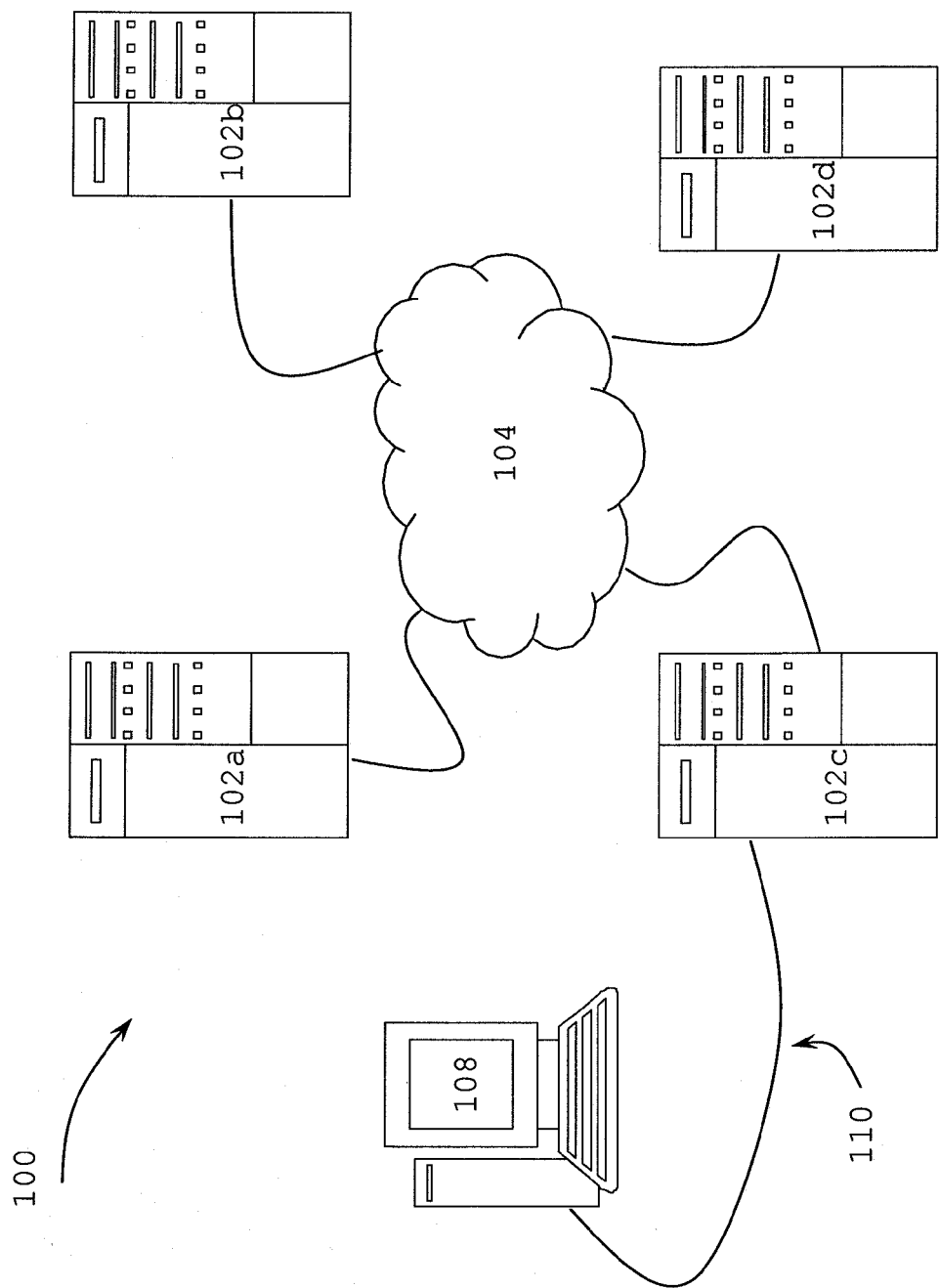
FIG. 1(a) and FIG. 1(b) illustrates schematic diagrams of a cluster computing system.

An embodiment of a method of maintaining operation of a cluster of computing devices includes an initial step of detecting a suspended kernel process on a first of the computing devices. In addition to the step of detecting the suspended kernel process the method includes the step of issuing a first signal that causes a cluster management process to disregard the first of the computing devices when determining if there exists a quorum of the computing devices.

An embodiment of a method of facilitating kernel debugging in a cluster of computing devices includes an initial step of detecting a suspended kernel process on a first of the computing devices. In addition to the initial step the embodiment of the method includes the step of issuing a first signal to cause a breakpoint to be set in kernel process of each of the computing devices.

An embodiment of a method of maintaining operation of a cluster of computing devices includes receiving a first signal that has been issued to cause a cluster management process to disregard a first of the computing devices, which has a suspended kernel process, when determining if there exists a quorum of the computing devices. Subsequent to receiving the first signal the embodiment of the method includes issuing a second signal to inform the cluster management process that the first of the computing devices is to be disregarded when determining if the quorum exists.

An embodiment of a method of facilitating kernel debugging in a cluster of computing devices includes a step of receiving a first signal that has been issued to cause a breakpoint to be set in a kernel process of each of the computing devices. The embodiment of the method also includes issuing a second signal to cause the breakpoint to be set in the kernel process of each of the computing devices.

An embodiment of a method of maintaining operation of a cluster of computing devices includes a step of receiving a first signal that has been issued as a result of a suspended kernel process being detected on a first of the computing devices. Subsequent to receiving the first signal the embodiment of the method includes disregarding the first of the computing devices when determining if there exists a quorum of the computing devices.

An embodiment of a method of supporting crash dump debugging in a cluster of computing devices includes the step of synchronising read operations to obtain crash dumps from the computing devices in order to form a single crash dump reader session.

An embodiment of a method of supporting live debugging in a cluster of computing devices includes the step of synchronising data obtained from special files of the computing devices and which have a copy of an executing operating system mapped thereto.

An embodiment of a device for maintaining operation of a cluster of computing devices includes a processing means arranged to perform the steps of: detecting a suspended kernel process on a first of the computing devices; and issuing a first signal that causes a cluster management process to disregard the first of the computing devices when determining if there exists a quorum of the computing devices.

An embodiment of a device for facilitating kernel debugging in a cluster of computing devices includes a processing means arranged to perform the steps of: detecting a suspended kernel process on a first of the computing devices; and issuing a first signal to cause a breakpoint to be set in a kernel process of each of the computing devices.

An embodiment of a device for maintaining operation of a cluster of computing devices includes a processing means arranged to perform the steps of: receiving a first signal that has been issued to cause a cluster management process to disregard a first of the computing devices, which has a suspended kernel process, when determining if there exists a quorum of the computing devices; and issuing a second signal to inform the cluster management process that the first of the computing devices is to be disregarded when determining if the quorum exists.

An embodiment of a device for facilitating kernel debugging in a cluster of computing devices includes a processing means arranged to perform the steps of: receiving a first signal that has been issued to cause a breakpoint to be set in a kernel process of each of the computing devices; and issuing a second signal to cause the breakpoint to be set in the kernel process of each of the computing devices.

An embodiment of a device for maintaining operation of a cluster of computing devices includes a processing means arranged to perform the steps of: receiving a first signal that has been issued as a result of a suspended kernel process being detected on a first of the computing devices; and disregarding the first of the computing devices when determining if there exists a quorum of the computing devices.

An embodiment of a system for supporting crash dump debugging in a cluster of computing devices includes a debugging means arranged to synchronising read operations to obtain crash dumps from the computing devices in order to form a single crash dump reader session.

An embodiment of a system for supporting live debugging in a cluster of computing devices includes a debugging means arranged to synchronise data obtained from special files of the computing devices and which have a copy of an executing operating system mapped thereto.

The technique disclosed here will be more fully understood from the following description. The description is provided with reference to the accompanying drawings.

Figure 1B:
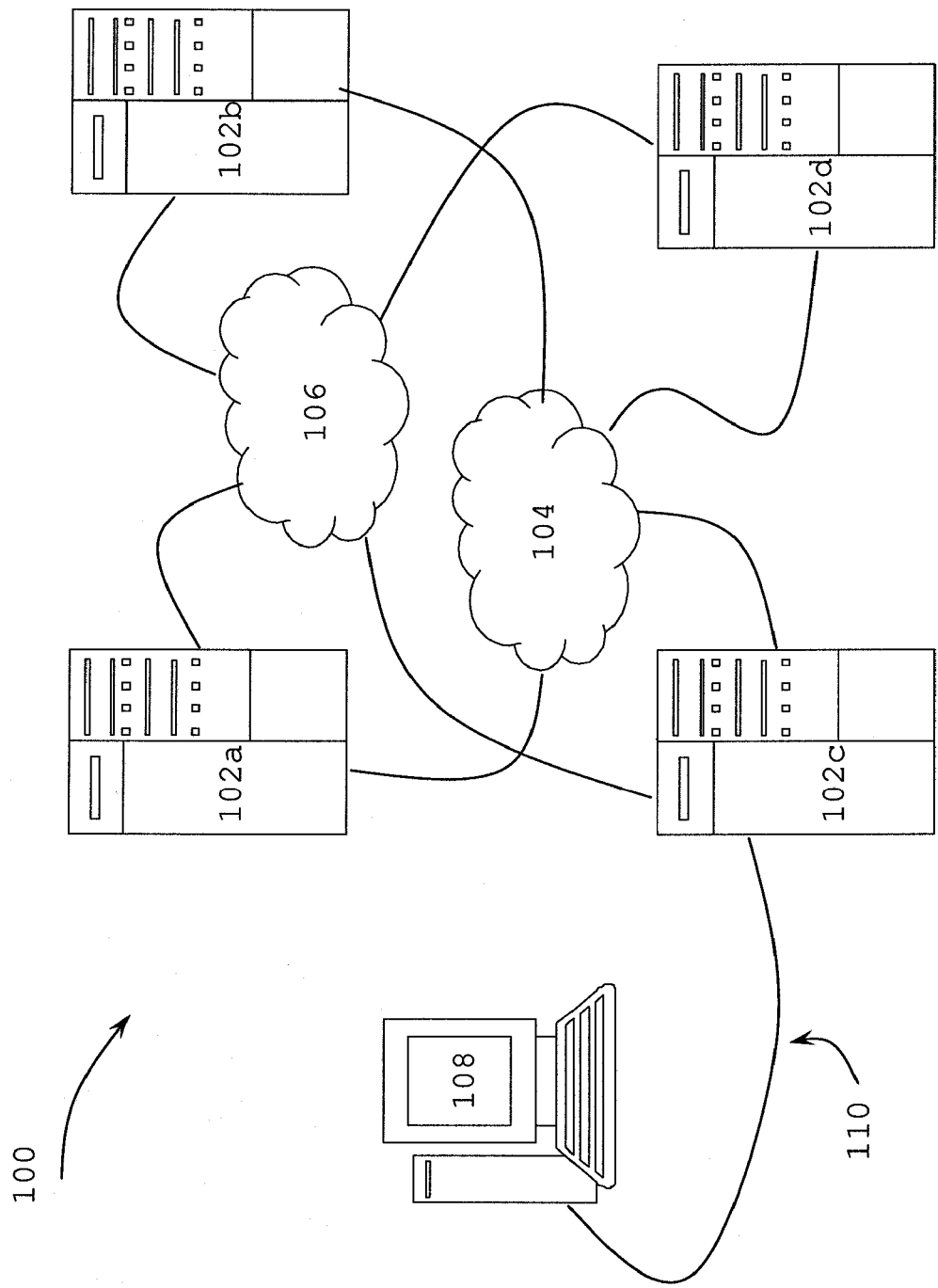

With reference to FIG. 1, the cluster computing system 100 includes a plurality of computing devices 102 in the form of computer servers and a physical data medium 104. FIG. 1(b) shows an alternative embodiment of the system 100, which includes an additional physical data medium 106. The physical data media 104 and 106 are in the form of a broadband coaxial cable. The system 100 also includes a computer terminal 108 in the form of a personal computer, and a data link 110.

Each computing device 102 includes traditional computer hardware such as a motherboard, a central processing unit (microprocessor), random access memory, a hard disk(s), network interface card(s) and a power supply. In addition to the computer hardware each computing device 102 is loaded with an operating system (for example, HP-UX), which resides on the hard disk of each computing device 102. The operating system cooperates with the computer hardware to provide an environment in which software applications can be executed.

The operating system is augmented with the clustering functionality of HP TruCluster to enable the computing devices 102 to cooperate with each other to form a cluster computing system. The cluster functionality includes, for example, kernel synchronisation services and quorum determination of the computer devices 102. By cooperating with each other to form the cluster computing system 100, the computing devices 102 are capable of providing a relatively high availability of services and increased scalability.

Figure 3:
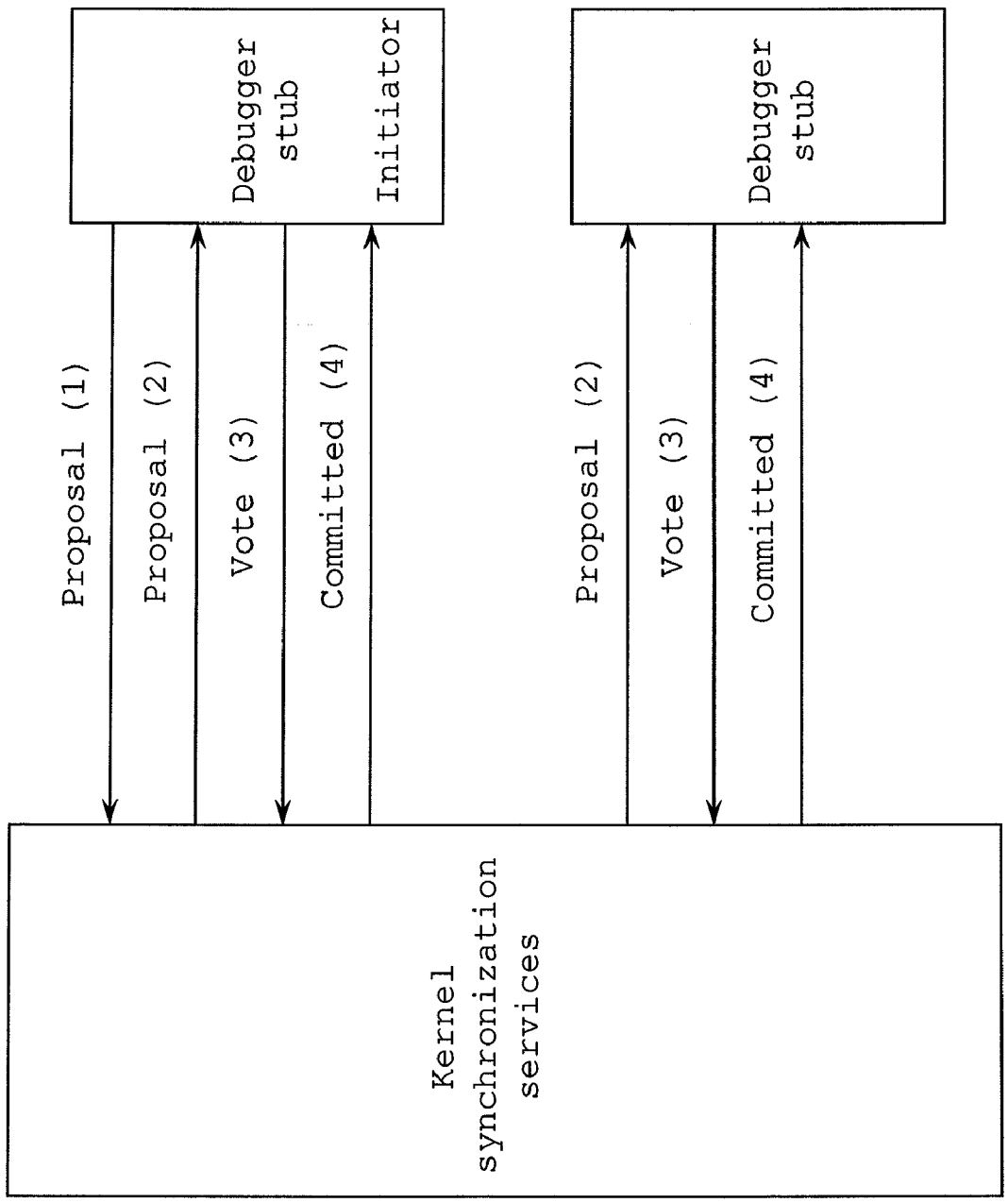
FIG. 3 illustrates a series of instructions between various elements of the system of FIG. 1(a)
Figure 5:
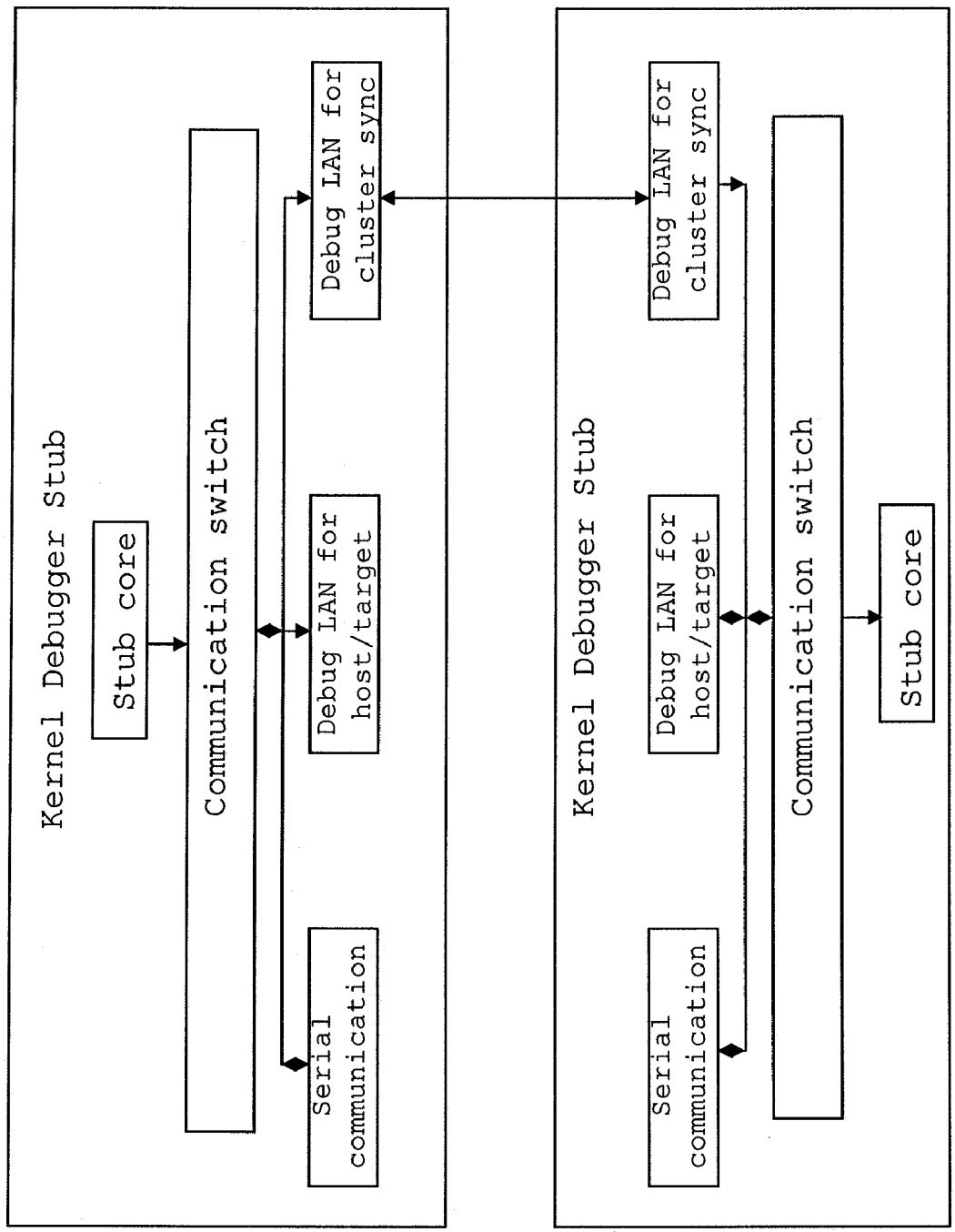
FIG. 5 illustrates a schematic diagram representing a structure of an element in the system of FIG. 1(b).

In addition to the operating system, the hard disk of each computing device 102 is loaded with a kernel debugging stub, which is based on the Kernel WildeBeest Debugger (KWDB). The kernel debugging stub is illustrated in FIGS. 3 and 5. The debugging stub is a component (module) of the operating system and is executed as soon as the operating system is loaded into memory for execution. The person skilled in the art will appreciate that the present technique is not restricted to a debugging stub that is based on the Kernel WildeBeest Debugger, and that alternative embodiments can employ debugging stubs based on other platforms such as, for example, GNU GDB. The kernel debugging stub is a piece of software that facilitates kernel debugging of the operating system loaded on the hard disk of each computing device 102.

The physical data medium 104 is used by the computing devices 102 to exchange data with each other. In the case of the embodiment shown in FIG. 1(a) the physical data medium 104 is used to carry both general data and kernel debugging related data. The computing devices 102 connect to the physical medium 104 via, for example, a memory channel adaptor. The other physical data medium 106 of the embodiment shown in FIG. 1(b) is dedicated to transferring only kernel debugging traffic, such as cluster-wide breakpoints. The main difference between the embodiments of the system 100 shown in FIG. 1(a) and FIG. 1(b) is that the former does not permit debugging of kernel level networking activities involving the physical data medium 104, while the embodiment of FIG. 1(b) allows debugging of kernel level networking activities involving the physical data medium 104. The additional physical medium 106 enables the embodiment of the system 100 shown in FIG. 1(b) to allow debugging of the kernel level networking activities.

The computer terminal 108 includes traditional computer hardware including a motherboard, a central processing unit, random access memory, a hard disk, network interface card, power supply, monitor, keyboard and mouse. In addition to the computer hardware, the computer terminal 108 includes an operating system (such as Linux) that resides on the hard disk of the computer terminal 108. The operating system cooperates with the hardware of the computer terminal 108 to provide an environment in which software applications can be executed. In this regard, the hard disk of the computer terminal 108 is loaded with a kernel debugging program, which is based on the Kernel WildeBeest Debugger. Persons skilled in the art will appreciate that the present technique is not restricted to a kernel debugging program that is based on Kernel WildeBeest Debugger. It is envisaged that other embodiments can employ a kernel debugging program based on other platforms such as, for example, GNU GDB.

The kernel debugging program of the computer terminal 108 and the debugging stub of the computing devices 102 are arranged to cooperate with each other, via the data link 110, to provide on-console and remote modes of kernel debugging. In relation to the on-console mode of kernel debugging, the data link 110 is in the form of a cable that is interconnected between a serial port of the computer terminal 108 and a serial port of one of the computing devices 102c. In the remote mode of kernel debugging the data link 110 is in the form of a network connection supported by a computer network such as, for example, a local area network. The network connection basically provides a point-to-point data connection between the computer terminal 108 and one of the computing devices 102c. To establish the network connection for remote mode kernel debugging the computer terminal 108 is arranged to establish the network connection using a cluster alias assigned to the system 100. The cluster alias is essentially a single network address that is used to represent all of the computing devices 102.

The kernel debugging program loaded on the computer terminal 108 is arranged to effect the presentation of a parent graphical terminal interface on the monitor of the computer terminal 108. The parent terminal interface allows a person to engage in various kernel debugging activities such as setting breakpoints in the operating systems, examining core dumps from crashed operating systems and examining memory. The parent terminal can be considered to provide a cluster wide view of the various kernel debugging activities being performed in the cluster computing system 100. In the present embodiment the computer terminal 108 runs an X-windows environment and thus the parent terminal interface runs in an xterm.

In addition to the parent terminal interface, the kernel debugging program is also arranged to effect the presentation of one or more graphical child terminal interfaces on the monitor of the computer terminal 108. The child terminal interfaces are similar to the parent terminal interface in that they allow a person to engage in kernel debugging activities. However, instead of providing a cluster wide view of kernel debugging activities each child terminal interface provides a computing device 102 view of debugging activities. More specifically, each child terminal interface enables a person to engage in kernel debugging activities that are restricted to a specific computing device 102. Consequently, each child terminal interface is associated with a unique kernel debugging stub of one of the computing devices 102. Each child terminal is also in the form of an xterm.

The kernel debugging program loaded on the computer terminal 108 is arranged to allow a person to start-up a child terminal interface by entering an attach command into the parent terminal interface. The attach command is also accompanied by a parameter that identifies the computing device 102 that the child terminal interface is to be associated with. The parameter is in the form of a network address of the relevant computing device 102, but could also be other identifiers in alternative embodiments including, for example, a domain name. In response to receiving the attach command the kernel debugging program loaded on the computer terminal 108 spawns the child terminal interface.

In the present embodiment each child terminal interface is not connected directly to its associated kernel stub on a computing device 102. Instead, each child terminal interface is indirectly connected to its associated kernel stub via the computing device 102c to which the computer terminal 108 is connected via the data link 110. As described in more detail in the subsequent paragraphs of this specification, the computing device 102c to which the computer terminal 108 is connected interacts with the kernel stub to which the child terminal is associated. Thus, the computing device 102c can be thought of as acting as a 'relay' for debugging commands. An advantage of using the computing device 102c as a relay is that it supports a more user friendly debugging session and requires minimal hardware resources to support cluster-wide kernel debugging.

As described previously, the kernel debugging program loaded on the computer terminal 108 enables a person to engage in kernel debugging of the operating systems loaded on the computing devices 102. In this regard, one of the activities that the kernel debugging program enables a person to engage in is the setting of one or more breakpoints in the operating systems of the computing devices 102. As persons skilled in the art will readily appreciate, being able to set a breakpoint in the operating system allows a person to suspend the execution of the operating system whenever a pre-specified particular kernel (operating system) function is executed by the kernel during the course of its operation.

The kernel debugging program and debugging stubs support two types of breakpoints: a cluster-wide breakpoint and a local breakpoint. A cluster-wide breakpoint is used to suspend the operation of the operating systems on all of the computing devices 102, in the cluster being debugged, while a local breakpoint is used to suspend the operation of an individual operating system (running on a specific computing device 102), which can be specified through a user specified identifier while setting the breakpoint through the debugger. Before setting either a cluster-wide or local breakpoint a person needs to identify one of the computing devices 102 in which the breakpoint (either cluster-wide or local) is going to be set. It is noted that the extent to which the breakpoints are applicable is defined as the "breakpoint scope", which can be altered during the execution of the cluster even after the breakpoint is set.

Once one of the computing devices 102 has been identified, the person initiates a child terminal (from the parent terminal) on the computer terminal 108 for the identified computing device 102. Once the child terminal has been initiated the person enters into the child terminal the appropriate command for setting a breakpoint. In the present embodiment, entering the appropriate comment for setting a breakpoint involves typing the command break in to the child terminal. The break command also accepts several parameters that enable the person to specify where the breakpoint is to be inserted into the operating system, and moreover a parameter that enables the person to specify whether the breakpoint is a cluster-wide breakpoint or a local breakpoint.

After a break command (and its associated parameters) have been entered into the child terminal, the kernel debugging program sends the command and the parameters via the data link 110 to the computing device 102c that acts as a relay. On receiving the command and the parameters, the computing device 102c initially determines which of the computing devices 102 the command and the parameters are intended for, which is done by examining control data accompanying the break command and the parameters. The control data basically represents a network address of the computing device 102 in which the breakpoint is to be set.

Once the computing device 102c acting as the relay has identified the computing device 102 for which the break command is intended, the computing device 102c interacts with the kernel debugging stub of the identified computing device 102 to set the required (cluster-wide or local) breakpoint in the operating system of the device 102. In order to interact with the kernel debugging stub of the identified computing device 102 the computing device 102c acting as the relay sends the break command and the associated parameters to the identified computing device 102c as data packets via the physical data medium 104 in the case of the embodiment shown in FIG. 1(a) and physical medium 106 for the embodiment shown in FIG. 1(b). On receiving the break command and associated parameters the kernel debugging stub inserts a breakpoint at the required location in the operating system.

Figure 2:
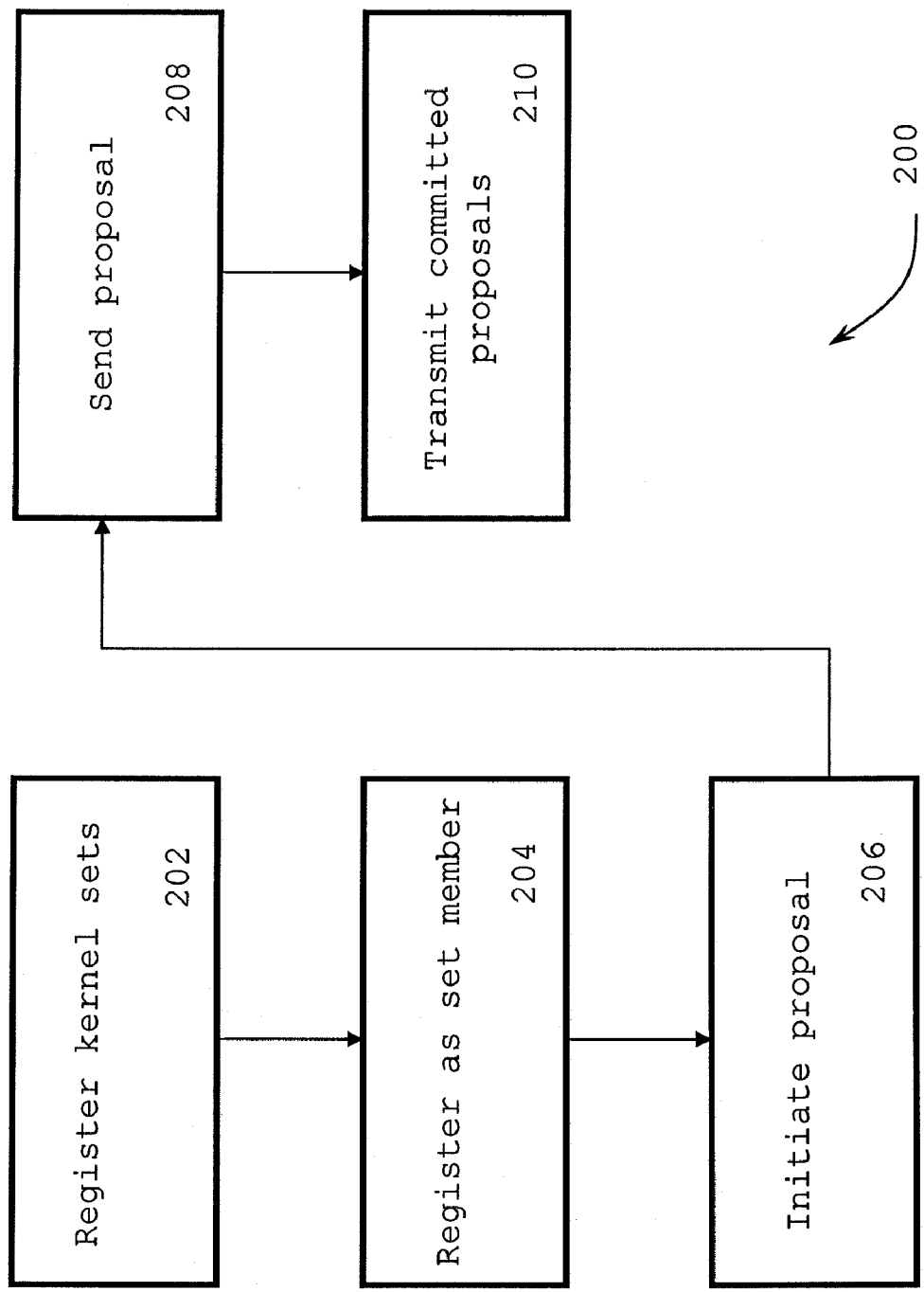
FIG. 2 illustrates a flow chart of various steps performed by the cluster computing system of FIG. 1(a)

In relation to handling breakpoints, the embodiment of the system 100 shown in FIG. 1(a) performs steps, which are shown in the flow chart 200 of FIG. 2, to facilitate kernel debugging. The first step 202 involves the kernel synchronization services registering a set of interfaces by calling a synchronization interface, which is depicted in FIG. 3. It is noted that the first step 202 is performed to maintain viability and quorum upon encountering a debug event (such as a breakpoint). More specifically the set of interfaces include:

kdebug_bp_setup: This interface set is responsible for setting up a remote break-point.
  kdebug_bp_stop_timer: This interface set is responsible for disabling heartbeat timer when a breakpoint is hit.

The above two kernel interface sets are used for cluster-wide kernel debugging. The step 202 of registering the two sets causes the sets to be added to the kernel's global list of synchonization sets along with other registered sets from other kernel (cluster) components.

The next step 204 performed by the system 100 involves each debugger stub on the computing devices 102 registering as a set member for each of the above sets of interfaces by calling a join_set( ) function. When registered as a set member, the debugger stubs have the capability to participate in voting. Upon successfully registering, the kernel synchronization services return handles to the debugger stub, which for example include kdebug_kch_bp_setup_handle for breakpoint setting handle, and kdebug_kch_bp_stop_timer_handle for requests to disabling cluster member heartbeat timer (which as described in subsequent paragraphs relates to determining whether quorum exists in the system 100). The handles are used for processing subsequent proposals. While registering the sets of interfaces, the debugging stub in effect registers callbacks that are called by the kernel synchronization services while forwarding proposals.

The debugger stubs on the computing devices 102 perform the step 206 of initiating proposals to other computing devices in the system 100 under the following scenarios:

When a clusterwide breakpoint is set, the debugger stub initiates a proposal using kdebug_kch_bp_setup_handle.

When a breakpoint is encountered by an operating system of a particular computing device 102, the debugger stub of the computing device 102 sends a proposal using the kdebug_kch_bp_stop_timer_handle to the other computing devices 102.

To make either of the above proposals, a function propose( ) is called. It is noted that the action of calling the propose( ) function results in debugging data being sent via the physical medium 104 in the other physical medium 106.

In response to a kernel stub invoking the propose( ) function to make a proposal, the kernel synchronization service is arranged to perform the step 208 of sending the above proposals to each of the computing devices 102. This results in a call to the debugger stub's callback function which would respond (vote) to the proposals. The debugger stub would respond to the proposal depending on its current state, validity of the breakpoint address etc. Responding to a proposal is done by invoking a respond( ) function. The step 208 of sending the proposals also results in debugging traffic being sent via the physical medium 104 in the alternative physical medium 104.

Following from the previous step 208, the kernel synchronization services perform the step 210 of transmitting committed proposals to each of the kernel stubs depending on their response (vote) if all the debugger stubs accept the proposals. Alternatively, the synchronization services sends a rejected proposal. Upon receiving the committed proposals the debugger stubs do the following:

For kdebug_kch_bp_setup_handle proposal, the stubs replace the specified address with the break instruction.

For kdebug_kch_bp_stop_timer_handle proposal, the non-initiator stubs set up the cluster debug state so that when kdebug_kch_bp_stop_timer_handle proposal is received the non-initiator, cluster members set up the cluster debug state so that the breakpoint hit member's vote is not calculated during quorum calculation. Also, other cluster server services dependent on the initiator kernel are ignored for cluster operation and viability.

The step 210 of transmitting committed proposals also results in debugging traffic being sent via the physical medium 104 or the other medium 106. The various interactions between the kernel debugger stubs and the kernel synchronization services are illustrated in FIG. 3.

Figure 4:
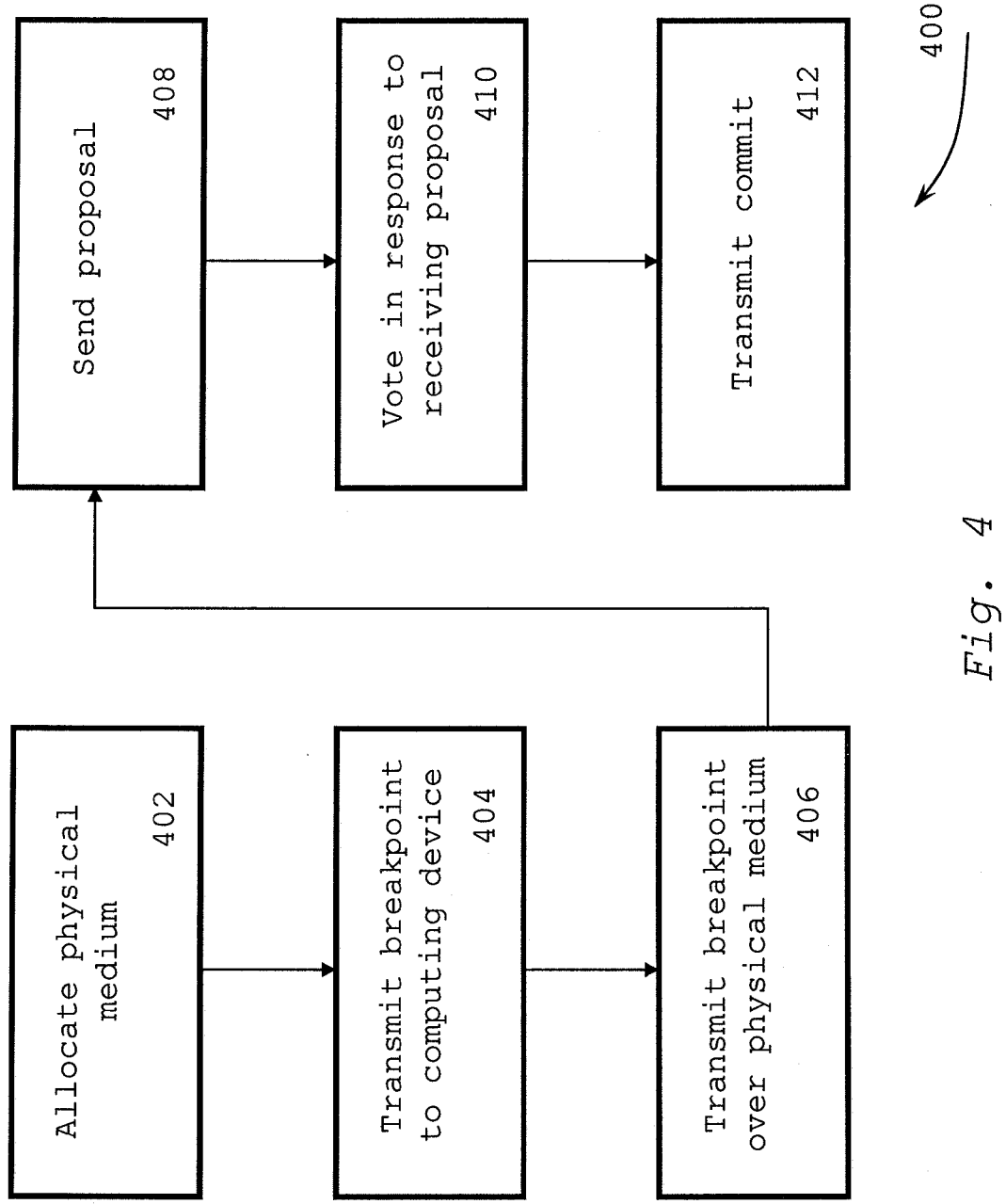
FIG. 4 illustrates a flow chart of various steps performed by the system of FIG. 1(b)

The aforementioned steps 202 to 210 are performed by the embodiment of the system 100 shown in FIG. 1(*a*). In contrast, the embodiment of the system 100 shown in FIG. 1(*b*) performs the steps 402 to 412 shown in the flow chart 400 of FIG. 4 when handling breakpoints for kernel debugging. The initial step 402 involves allocating the other physical data medium 106 for the exclusive use of debugging traffic. As indicated previously, the step 402 of allocating the physical data media 106 provides high-level and low-level network level kernel debugging in addition to debugging the rest of the system 100.

When the operating system is booted with kernel debugging options on a clustered environment, the operating system scans the systems hardware and selects a usable LAN card at the lowest hardware address for program (kernel) debugging. From a conceptual point of view, a new communication mechanism (for example, debug LAN communication for clusterwide synchronization) would be created that helps coordination and maintenance of cluster quorum during clusterwide kernel debugging. The new layer would be operational during cluster-wide communications. A high-level diagram of such a conceptual view is shown in FIG. 5.

Following on from the previous step 402, the next step 404 involves transmitting a breakpoint from the computer terminal 108 to the computing device 102*c* to which the terminal 108 is connected via datalink 110. This process is described in previous paragraphs of this specification. To differentiate between a cluster-wide breakpoint and a local breakpoint a flag in the breakpoint packet sent by the computing device 102*c* is set (or not set) as required. For a cluster-wide breakpoint, the computing device 102*c* receiving the breakpoint from the computer terminal 108 carries out the step 406 of transmitting the breakpoint via the physical media 106.

The physical media 106 is used to broadcast the breakpoint packet and to receive a response (vote) from the computing devices 102. Once all the computing devices 102 approve the proposal (sent during the previous step 406), the cluster-wide breakpoint is set. The initiating debugger stub waits for a specific turn around time before timing out the breakpoint set request.

A debugger stub receiving a breakpoint set request gets an (external) interrupt from the cluster-debug LAN card (connected to the physical media 106) upon receiving the breakpoint set-request packet. The debugger stub tests for the correctness of the breakpoint address, and if successful, it performs the step 408 of voting positively in response to the request. Otherwise, the debugger stub can reject the proposal. The step 408 of voting also involves sending debugging data over the physical medium 106. As in the kernel synchronization approach, a breakpoint is set cluster-wide if the initiator finds that a quorum is reached in relation to the breakpoint. If quorum is reached the initiator broadcasts, via the physical medium 106, a commit packet for the breakpoint through the cluster-debug LAN card to the other members.

It is noted that a similar series of steps to those of flow chart 400 is followed when a breakpoint is hit in one of the computing devices 102 for addressing quorum issues (when a local breakpoint is hit) or for suspending all the computing devices participating in a breakpoint (for cluster-wide breakpoint).

The kernel debugging program loaded on the computer terminal 108 is arranged to support crash dump debugging of the computing devices 102. Crash dump debugging can be performed when, for example, the computing devices 102 go down (fail) as a result of a software panic or hardware failure. To support crash dump debugging the operating systems loaded on the computing devices 102 are arranged to create a crash dump when they go down. The crash dumps are in the form of electronic files that each operating system writes to its local hard disk and record the state of the machine at the time of failure.

When the kernel debugging program performs crash dump debugging it initially reads the crash dumps from the computing devices 102. To read the crash dumps across a cluster, the kernel debugging program performs a remote read operation via the computing device 102*c* to which the computer terminal 108 is connected via the data link 110. The computing device 102*c* supports the kernel debugging program's remote read operation over the physical data media 104 and/or 106. In response to the remote read operation the computing devices 102 provide access to the crash dump files.

When reading the crash dump files, the kernel debugging program synchronizes the various remote read operations (performed via the debug LAN interface) and presents the crash dump information for all computing devices 102 in a single debugging instance. The advantage of this is that it is not necessary for the user of the kernel debugging program to initiate separate crash dump debugging sessions on all members of the cluster. The single debugging instance effectively enables the user to view the crash dump information from the computing devices 102 in a single session.

In addition to crash dump debugging, the kernel debugging program loaded on the terminal computer 108 is arranged to support live debugging of the computing devices 102. Live debugging involves debugging a copy of the executing kernel that has been mapped to a special file such as, for example, /dev/kmem and /dev/mem. In this regard, each of the computing devices 102 which are cluster members is capable of making a copy of the associated kernel and mapping it to the relevant special file.

When performing live debugging, the kernel debugging program essentially establishes a single live debugging session that is capable of accessing the special files located on each of the computing devices 102. The live debugging session is effectively supported by the computing device 102 to which the computer terminal 108 is connected and the physical media 104 and/or 106. The live debugging session involves reading mapped kernel information from the special files. The single live debugging session is constituted by synchronizing data read from the special files via the debug LAN interface of the computing devices 102.

The advantage of establishing the single live debugging is that the user does not need to establish individual live debugging sessions to all computing devices 102. Establishing individual live debugging sessions is undesirable as it would be practically difficult for the user, particularly when there are numerous computing devices 102.

While the present technique has been described with reference to the aforementioned embodiments, it will be understood by those skilled in the art that alterations, changes and improvements may be made and equivalents may be substituted for the elements thereof and steps thereof without departing from the scope of the present disclosure. In addition, many modifications may be made to adapt to a particular situation or material to the teachings of the present technique without departing from the central scope thereof. Such alterations, changes, modifications and improvements, though not expressly described above, are nevertheless intended and implied to be within the scope and sprit of the disclosure. Therefore, it is intended that the disclosed technique not be limited to the particular embodiments disclosed as the best mode contemplated for carrying out this technique, but that the technique will include all embodiments falling within the scope of the independent claims.

In relation to the above paragraph, it is noted that even though this description of the embodiment refers only to breakpoints it will be appreciated by those skilled in the art that the present technique is not restricted to being used with breakpoints. For example, the technique disclosed here may be used in conjunction with watchpoints (which are activated once a pre-defined data object is accessed by the operating system during the course of its execution), and catchpoints (which are activated when a shared dynamically loadable kernel module is loaded into kernel memory).

Although the technique has been described by way of example and with reference to particular embodiments it is to be understood that modification and/or improvements may be made without departing from the scope of the appended claims.

Where in the foregoing description reference has been made to integers or elements having known equivalents, then such equivalents are herein incorporated as if individually set forth.

The invention claimed is:

1. A method of facilitating kernel debugging in a cluster of computing devices, the method comprising the steps of:
   detecting a suspended kernel process on a first of the computing devices; and
   issuing a first signal to cause a breakpoint to be set in a kernel process of each of the computing devices, wherein the step of issuing the first signal comprises invoking a function that causes a cluster synchronization process to issue a second signal that causes the breakpoint to be set in the kernel process of each of the computing devices.

2. The method as claimed in claim 1, wherein the step of issuing the first signal comprises the steps of:
   sending a first message to each of the computing devices via a communication network;
   receiving via the communication network a plurality of second messages sent by the computing devices in response to receiving the first message; and
   sending a third message to each of the computing devices via the communication network.

3. The method as claimed in claim 2, wherein the communication network is in the form of a local area network dedicated to transferring kernel debugging data.

4. The method as claim in claim 1, the method further comprising the steps of:
   receiving a first signal that has been issued to cause a breakpoint to be set in a kernel process of each of the computing devices.

5. The method as claimed in claim 4, further comprising the steps of:
   receiving a third signal that has been issued in response to the second signal being issued; and
   issuing a fourth signal in response to receiving the third signal.

6. The method as claimed in claim 5, wherein the steps of issuing the second signal, receiving the third signal and issuing the fourth signal respectively comprises the steps of issuing the second signal to a communication network, receiving the third signal from the communication network, and issuing the fourth signal to the communication network.

7. The method as claimed in claim 1, wherein the method further comprises:
   processing by detecting a suspended kernel process on a first of the computing devices.

8. The method as recited in claim 7, wherein the processing further comprises:
   sending a first message to each of the computing devices via a communication network;
   receiving via the communication network a plurality of second messages sent by the computing devices in response to receiving the first message; and
   sending a third message to each of the computing devices via the communication network.

9. The method as claimed in claim 8, wherein the communication network is in the form of a local area network dedicated to transferring kernel debugging data.

10. The method as recited in claim 8, wherein the processing further comprises:
    receiving a first signal that has been issued to cause a breakpoint to be set in a kernel process of each of the computing devices.

11. The method as claimed in claim 10, wherein the processing further comprises:
    receiving a third signal that has been issued in response to the second signal being issued; and issuing a fourth signal in response to receiving the third signal.

12. The method as claimed in claim 10, wherein the processing further comprises issuing the second signal, receiving the third signal and issuing the fourth signal respectively comprises the steps of issuing the second signal to a communication network, receiving the third signal from the communication network, and issuing the fourth signal to the communication network.

13. A method of supporting crash dump debugging in a cluster of computing devices, the method comprising the steps of:
synchronising read operations to obtain crash dumps from the computing devices in order to form a single crash dump reader session; and
facilitating kernel debugging in the cluster of computing devices by steps comprising:
detecting a suspended kernel process on a first of the computing devices; and
issuing a first signal to cause a breakpoint to be set in a kernel process of each of the computing devices, wherein the step of issuing the first signal comprises invoking a function that causes a cluster synchronization process to issue a second signal that causes the breakpoint to be set in the kernel process of each of the computing devices.

14. The method as claimed in claim 13, wherein the read operations are performed via a debug local area network interface.

15. A method of facilitating kernel debugging in a cluster of computing devices, the method comprising the steps of:
storing, in a memory communicatively coupled to a processor, computer-executable instructions for performing the method of facilitating kernel debugging in a cluster of computing devices;
executing the instructions on the processor;
according to the instructions being executed:
detecting a suspended kernel process on a first of the computing devices; and
issuing a first signal to cause a breakpoint to be set in a kernel process of each of the computing devices, wherein the step of issuing the first signal comprises invoking a function that causes a cluster synchronization process to issue a second signal that causes the breakpoint to be set in the kernel process of each of the computing devices.

16. The method as claimed in claim 15, wherein the step of issuing the first signal comprises the steps of:
sending a first message to each of the computing devices via a communication network;
receiving via the communication network a plurality of second messages sent by the computing devices in response to receiving the first message; and
sending a third message to each of the computing devices via the communication network.

17. The method as claimed in claim 16, wherein the communication network is in the form of a local area network dedicated to transferring kernel debugging data.

18. The method as claimed in claim 15, the method further comprising the steps of:
receiving a first signal that has been issued to cause a breakpoint to be set in a kernel process of each of the computing devices.

19. The method as claimed in claim 18, further comprising the steps of:
receiving a third signal that has been issued in response to the second signal being issued; and
issuing a fourth signal in response to receiving the third signal.

20. The method as claimed in claim 19, wherein the steps of issuing the second signal, receiving the third signal and issuing the fourth signal respectively comprises the steps of issuing the second signal to a communication network, receiving the third signal from the communication network, and issuing the fourth signal to the communication network.

* * * * *

UNITED STATES PATENT AND TRADEMARK OFFICE
CERTIFICATE OF CORRECTION

| | | |
|---|---|---|
| PATENT NO. | : 7,818,623 B2 | Page 1 of 1 |
| APPLICATION NO. | : 11/550538 | |
| DATED | : October 19, 2010 | |
| INVENTOR(S) | : Sabyasachi Sengupta et al. | |

It is certified that error appears in the above-identified patent and that said Letters Patent is hereby corrected as shown below:

In column 10, line 25, in Claim 4, delete "claim in" and insert -- claimed in --, therefor.

Signed and Sealed this
Twenty-ninth Day of March, 2011

David J. Kappos
*Director of the United States Patent and Trademark Office*